United States Patent [19]

Lo et al.

[11] Patent Number: 4,874,657
[45] Date of Patent: Oct. 17, 1989

[54] METHODS OF PRODUCING BIAXIALLY-ORIENTED POLYMER PRODUCT, AND THE PRODUCT PRODUCED THEREBY

[75] Inventors: Ying-Cheng Lo, Mundelein, Ill.; Darral V. Humphries, Allentown, Pa.

[73] Assignee: Kusan, Inc., Nashville, Tenn.

[21] Appl. No.: 933,951

[22] Filed: Nov. 24, 1986

Related U.S. Application Data

[63] Continuation-in-part of Ser. No. 806,994, Dec. 9, 1985, Pat. No. 4,789,514.

[51] Int. Cl.[4] .................. B29C 55/16; B29C 43/16; B29C 43/48
[52] U.S. Cl. .................. 428/220; 264/280; 264/290.2; 264/322; 264/323; 425/363; 425/384; 425/394; 425/407; 425/411; 428/910
[58] Field of Search .................. 264/323, 323, 290.2, 264/280; 425/363, 384, 394, 407, 411, ; 428/220, 910

[56] References Cited

U.S. PATENT DOCUMENTS

| | | | |
|---|---|---|---|
| 3,551,545 | 12/1970 | Overdiep | 264/323 X |
| 3,714,320 | 1/1973 | Shaw | 264/323 |
| 3,939,243 | 2/1976 | Dawson | 264/322 |
| 3,963,813 | 6/1976 | Keith | 264/322 X |
| 3,989,779 | 11/1976 | Brunnhofer | 264/323 X |
| 4,234,530 | 11/1980 | Thiel et al. | 264/322 X |
| 4,361,527 | 11/1982 | Rau | 264/322 X |
| 4,440,702 | 4/1984 | Susnjara | 264/322 X |
| 4,629,650 | 12/1986 | Kataoka | 264/290.2 X |
| 4,789,514 | 12/1988 | Lo | 264/323 X |

Primary Examiner—Philip Anderson
Attorney, Agent, or Firm—Millen, White & Zelano

[57] ABSTRACT

In accordance with the instant invention, biaxially-oriented polymer sheet is produced by continuously forging polymer feedstock between pairs of converging opposed surfaces. After it is biaxially-oriented, the sheet product is either cooled or heated while being restrained and advanced. The sheet produced by the process and apparatus has substantially uniform strain distribution over the width and length thereof as well as through the thickness thereof.

33 Claims, 3 Drawing Sheets

METHODS OF PRODUCING BIAXIALLY-ORIENTED POLYMER PRODUCT, AND THE PRODUCT PRODUCED THEREBY

RELATED PATENT APPLICATIONS

The instant invention is a continuation-in-part of U.S. patent application Ser. No. 806,994, filed Dec. 9, 1985, now U.S. Pat. No. 4,789,514 and assigned to the assignee of the instant invention.

BACKGROUND OF THE INVENTION

The instant invention relates to methods of producing biaxially-oriented polymer product and to the product produced thereby. More particularly, the instant invention is directed to methods of producing such product by continuous forging wherein polymer feedstock is advanced between a pair of opposed belts.

Biaxially-oriented polymers such as the polypropylene polymers sold under the trademark BEXOR have numerous advantages over unoriented polymers in that they have higher strength, improved stiffness, increased toughness and superior thermoformability. Biaxially-oriented polymers have been successfully produced using the techniques disclosed in U.S. Pat. No. 4,282,277, the disclosure of which is incorporated herein by reference, assigned to the assignee of the instant invention, wherein a tubular product is initially produced by hydrostatic extrusion using a mandrel in combination with a conical die. The tubular product is then cut, flattened and annealed utilizing expensive flattening and annealing equipment. While the mandrel-conical die approach results in excellent biaxial orientation of structures, it is necessary to expend considerable effort to remove residual curvature in the resulting sheet. Even when the curvature has been removed by reconfiguring the extruded tube into a flat sheet, residual and unbalanced stresses and strains in the original tube tend to subsequently re-assert themselves, resulting in difficulties when using the sheet.

In addition, the cost of the biaxially-oriented sheet produced in accordance with the teachings of U.S. Pat. No. 4,282,277 is relatively high since only a single billet may be extruded at a time and intermittent production results in high yield losses. In addition, it has proved expensive and difficult to keep the mandrel properly aligned within the die and produce uniform sheet during the extrusion process.

In order to avoid the expense of first forming a tube and subsequently slitting and flattening the tube to form a biaxially-oriented sheet, the inventors of the instant invention explored extruding polymers while in the solid state utilizing dies with protrusions therein as is set forth in U.S. patent application Ser. No. 806,994, filed Dec. 9, 1985, which application is the parent of the instant application. Utilizing protrusions within flat dies overcomes the non-uniformity which ordinarily occurs in flat dies due to friction between the workpiece and the die. While this approach results directly in a product which does not have to be slit and flattened before producing sheet, the process is an intermittent one wherein the sheets are produced one at a time as opposed to a continuous process. Moreover, utilization of a stationary die requires a very large machine, which can withstand required extrusion pressures on the order of 10,000 psi (70.3 kg/cm$^2$) or more. Such a machine requires a considerable initial capital outlay.

While biaxially-oriented sheet can be produced by forging and cross-rolling, each of these processes have the drawback of being batch processes as opposed to continuous processes and have serious size and economic limitations. Consequently, it is difficult to produce elongated sheets of material. In addition, with a purely forged sheet, the sheet must be produced from a circular blank in order to have uniform biaxial orientation. The blank must then be trimmed which is both an additional step and a waste of material. While sheets produced by cross-rolling have an acceptable rectangular shape, they exhibit wavy surfaces resulting from non-uniform elastic springback of sheet emerging from the roll nip and consequently are not necessarily suitable for subsequent shaping and forming. Also, due to the short deformation time in cross rolling, the elastic springback results in a reduction of properties such as stiffness.

Recognizing the advantages of utilizing a continuous process for producing biaxially-oriented sheet, U.S. patent application Ser. No. 806,994 proposes an arrangement wherein a pair of converging belts, supported by rollers, continuously squeeze feedstock while biaxially orienting the feedstock to create biaxially-oriented sheet. However, support rollers which impart a convex surface to the belt are needed to compensate for the surface friction effect on the belt and the workpiece and produce a sheet uniformly biaxially oriented across the width.

Pursuing the opposed-belt concept, the inventors of the instant invention investigated utilization of a twin belt annealing press of the type generally utilized to manufacture items such as particle board, wherein wood particles or fibers are pressed together in the presence of a bonding agent to create sheets of material. This type of process is practiced at lower pressures than those required to biaxially orient polymers and was proved by tests to be unsatisfactory. The inventors also explored twin-belt machines used for producing metal sheet or slab by continuous casting. However, continuous casting machines only require sufficient pressure to retain the melt being processed thereby. In these types of machines, molten metal is deposited between a pair of converging belts and is spread laterally and longitudinally between the belts in order to continuously produce a metallic sheet product. In view of these approaches, there appeared to be little promise in utilizing opposed belt approaches for biaxially orienting feedstock to produce biaxially-oriented polymer sheet.

SUMMARY OF THE INVENTION

In view of the aforementioned difficulties encountered in producing biaxially-oriented polymer product by a continuous process as opposed to an intermittent process, it is an object of the instant invention both to provide methods of producing such product by continuous forging and to provide the product itself.

The instant invention contemplates a method of producing biaxially-oriented polymer product, such as polymer sheet, by introducing a solid workpiece of polymer feedstock in an axial direction between a pair of moving opposed endless surfaces which converge in a downstream direction.

The surfaces, which may be in the form of belts, converge toward one another at an angle in an approximate range greater than zero degrees and less than six degrees, depending on numerous factors such as polymer composition, surface friction, workpiece width and thickness and workpiece temperature. The feedstock is simultaneously elongated in a longitudinal direction while spreading in a lateral direction as it is reduced in thickness. By such a process, the material is advanced at an increasing speed between the surfaces due to frictional engagement of the surfaces with the workpiece and emerges at the end of the deformation zone as biaxially-oriented sheet at the same speed as the surfaces. The temperature of the workpiece is maintained between the glass transition temperature and the viscous flow temperature thereof during deformation and the surfaces at a temperature which equalizes the surface friction effect and the internal resistance to compressive flow of the polymer. Immediately after the workpiece has been reduced in thickness, it is restrained for a period of time and at a temperature sufficient to stabilize the morphology thereof through crystallization or crosslinking so that the product remains stable subsequent to the biaxial-orientation production.

Preferably, the material and surfaces are heated to a temperature level above the glass transition temperature of the polymer, but below the temperature at which viscous flow occurs and maintained in this temperature range during deformation of the workpiece while the product is either cooled during the restraining step or heated to permit stabilization of the structure through crystallization or crosslinking.

Preferably, the polymer may be selected from a semicrystalline group of materials including polypropylene, polyethylene, ultra-high molecular weight polyethylene, polyacetal, polyamide, polyethylene terephthalate, and polybutylene terephthalate. The polymer could also be selected from an amorphous group of materials including polyvinyl chloride, polystyrene, polymethylmethacrylate, polycarbonate and polyethylene terephthalate. The aforementioned polymers can also be biaxially oriented with up to 60% by weight of fillers such as calcium carbonate, talc, mica, or alumina trihydrate. Fillers which render sheets formed fire proof or fire retardant, e.g., those comprising aluminum trihydrate, can be used to form structural panels, e.g., for aircraft interiors, which heretofore was not possible because sheets formed from such filled polymers lacked sufficient flexural and impact strength to be utilizable for such end uses.

Apparatus for practicing the methods of the instant invention include a continuous forging machine in the form of a twin-belt press having a pair of temperature controlled opposed belts which converge to biaxially orient the polymer in a first region. The first region includes a pair of opposed platens to stiffen the belts. The opposed belts may also extend through a second region in which the sheet, which has been biaxially oriented by continuous forging, is stabilized while restrained between the belts.

The novel polymer sheet has planar surfaces, is semi-crystalline or amorphous and has a density equal to or higher than that of the unoriented polymer from which it is produced. The sheet has a uniform distribution of deformed crystalline aggregates in a matrix of deformed amorphous molecules, or has deformed amorphous molecules only, through the thickness thereof with substantially uniform strain distributed throughout the sheet.

Upon further study of the specification and appended claims, further objects and advantages of this invention will become apparent to those skilled in the art.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, wherein thicknesses of the polymer being processed are enlarged for clarity and wherein.

DESCRIPTION OF THE PREFERRED EMBODIMENT

Figure 1:
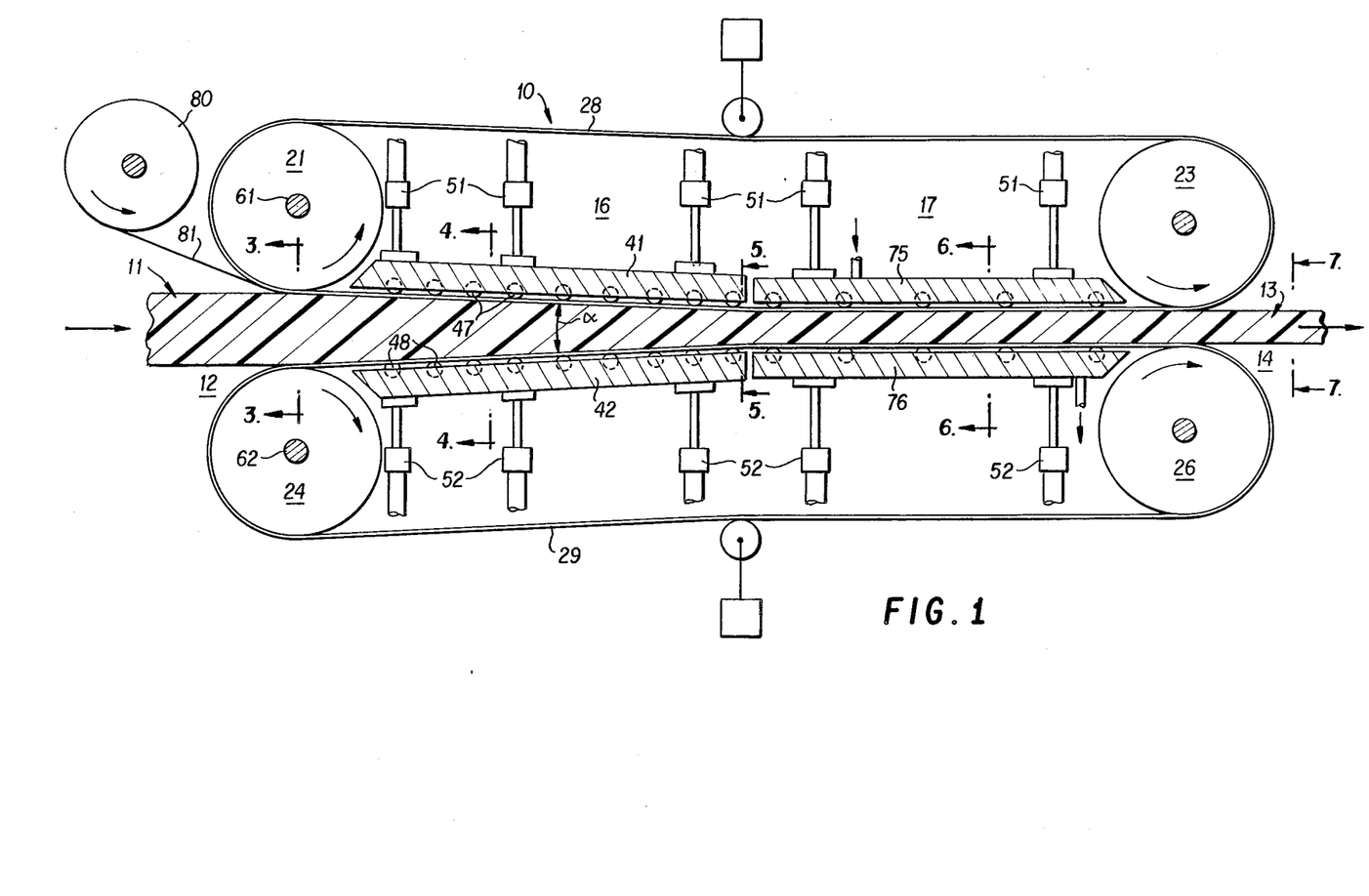
FIG. 1 is a side view of apparatus for practicing the method of the instant invention used to produce biaxially-oriented sheet having a new and improved structure.

Referring now to FIG. 1, there is shown a twin-belt press, designated generally by the numeral 10, configured in accordance with the principles of the instant invention. The twin-belt press 10 receives polymer feedstock, designated generally by the numeral 11, at its upstream end 12 and dispenses biaxially-oriented sheet 13 at its downstream end 14. The twin-belt press 10 has a first region 16 which biaxially orients the feedstock 11 and a second region 17 which restrains the biaxially-oriented feedstock as the feedstock is cooled so that the resulting sheet 13 is planar and stable.

The first region 16 of the twin-belt press 10 has similarities to machines produced by Kurt Held, Kusters and Bahre and Greten of West Germany. The press 10 includes two upper rollers 21 and 23 and two opposed lower rollers 24 and 26. Trained around the upper rollers 21 and 23 is a metal belt 28, while trained around the lower rollers 24 and 26 is a belt 29. The belts 28 and 29 are preferably made of chrome plated steel, are seamless and have a hardness of at least 45 Rockwell C.

Considering the first zone 16 more particularly, it is seen that the portion of the belts 28 and 29 between the rollers 21 and 24 and the second zone 17 are urged into substantially uniform engagement with the feedstock 11 by a pair of opposed upper and lower platens 41 and 42.

The angle α between the belts 28 and 29 in the first region 16 is in the approximate range of greater than zero degrees and less than six degrees.

The optimum angle α for producing balanced biaxially orientation is a function of the thickness of the polymer feedstock 11, the width thereof, the polymer composition, and the desired orientation ratio. For polypropylene feed stock 0.5 inches (12.7 mm) thick and 6 inches (15.2 cm) wide, the angle α for a balanced biaxial orientation ratio of 2.2–2.5 is typically in the range of 2.48 degrees to 3.14 degrees. The specific angles α for particular materials are derived by an experimental program designed to define the effects of temperature, surface friction, polymer composition and orientation ratio desired.

The rollers 21 and 24 are heated to a temperature between the glass transition temperature of the polymer and temperature of viscous flow of the feedstock 11. Preferably, the feedstock 11 is also heated to a temperature above the glass transition temperature but below the temperature of viscous flow prior to passing the feedstock through the first region 16. Generally, if the feedstock 11 being biaxially oriented is polypropylene, it will be heated to approximately 146 degrees C. as will the platens 41 and 42 and rollers 21 and 24. The temperature rise upon working the feedstock 11 does not rise above the viscous flow temperature of polypropylene.

Precise control of the relative temperatures of the surfaces and the feedstock within the overall temperature range as defined above, is an essential parameter in equalizing the surface friction and flow resistance of the polymer thereby achieving substantially uniform biaxial through-the-thickness orientation. For example, in the case of polypropylene, it has been shown that substantially uniform biaxial orientation is achieved when the surfaces are heated to about 160 degrees C. and the workpiece to about 146 degrees C.

With the twin belt machine 10 there is a constant belt velocity from the inlet end 12 of the machine to the outlet end 14. Accordingly, the twin-belt machine 10 diminishes the sliding friction which is not caused by deformation of the workpiece and which occurs with the flat or conical die approach wherein the feedstock is pushed through the die. Frictional forces which occur between the belts 28 and 29 are created by spreading the polymer of the feedstock 11. These forces are substantially less than the sliding frictional forces which occur when solid-state extruding the feedstock 11 by urging it through a stationary die.

Figure 2:
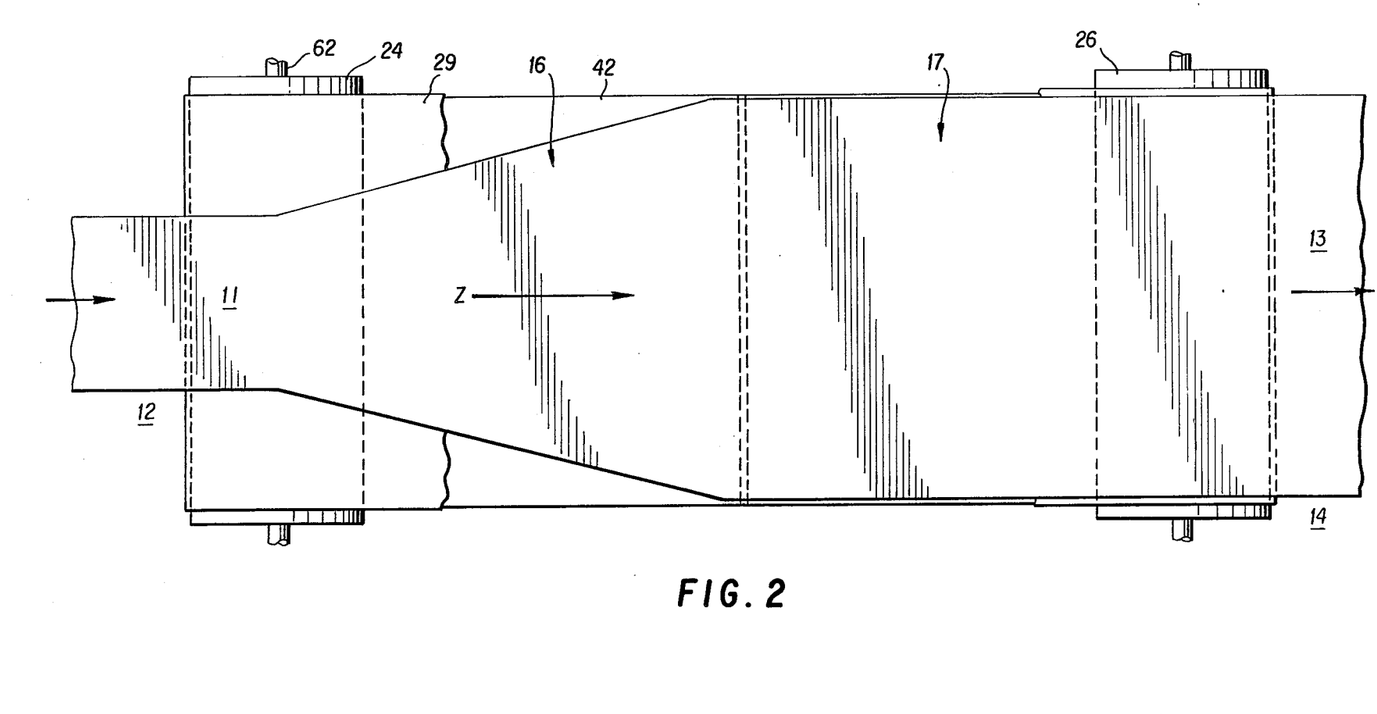
FIG. 2 is a top view of a portion of the apparatus of FIG. 1 showing the process by which polymer feedstock is biaxially-oriented and converted into stable biaxially-oriented sheet.
Figure 3:
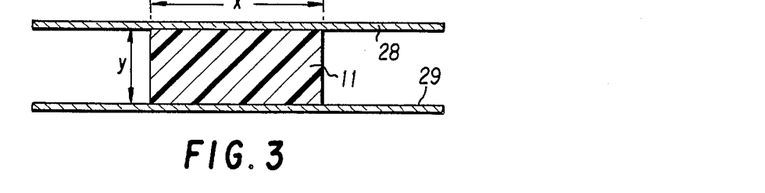
FIG. 3 is a cross-section taken along line 3—3 of FIG. 1, showing dimensions with exaggerated thicknesses of feedstock entering the apparatus of FIG. 1.
Figure 4:
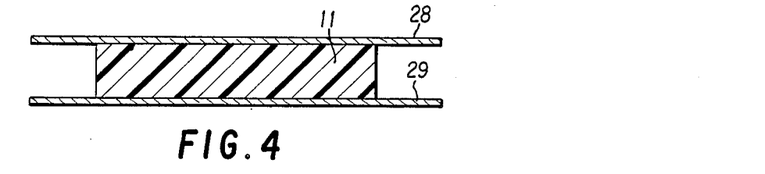
FIG. 4 is a cross-section taken along lines 4—4 of FIG. 1, showing the feedstock of FIG. 3 with exaggerated thicknesses being biaxially-oriented by the apparatus of FIG. 1.
Figure 5:
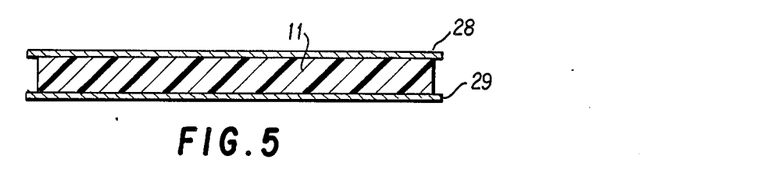
FIG. 5 is a cross-section taken along lines 5—5 of FIG. 1, showing feedstock with exaggerated thicknesses after it has been biaxially-oriented, but before it has been cooled.
Figure 6:
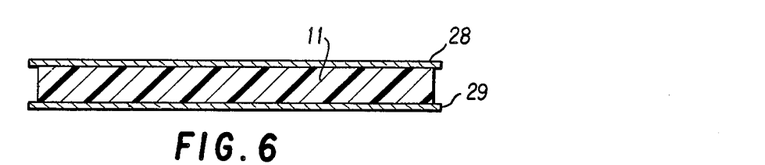
FIG. 6 is a cross-section taken along lines 6—6 of FIG. 1, showing the sheet with exaggerated thicknesses being retained as it is being cooled and advanced.
Figure 7:
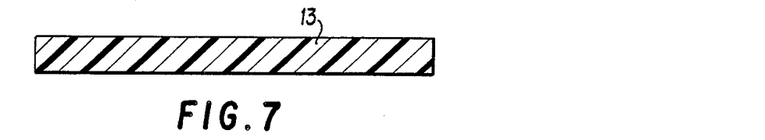
FIG. 7 is a cross-section of the biaxially-oriented sheet with exaggerated thickness taken along lines 7—7 of FIG. 1.
Figure 8:
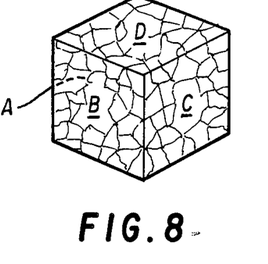
FIG. 8 is a perspective view of a square coupon of semi-crystalline unoriented polymer prior to biaxial-orientation thereof.
Figure 9:
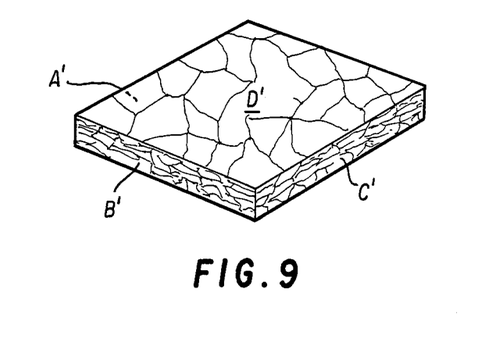
FIG. 9 is a perspective view of the coupon of FIG. 8, after biaxial-orientation showing the conversion of the spherulites into flat, plate-like structures.

Referring now more specifically to FIGS. 2–9 wherein the configuration of the feedstock 11 is shown as it is worked to produce the sheet 13, as is seen in FIG. 3, the feedstock 11 enters between the nip of rollers 21 and 24 having a relatively thick vertical dimension Y and relatively narrow width X. As the feedstock 11 advances through the first region 16, the Y dimension decreases and the lateral X dimension increases as does the Z dimension (as is shown in FIG. 2). When the feedstock 11 reaches the end of the first zone, it has spread in the X direction to a degree sufficient to extend substantially completely across the belts 28 and 29. As is seen in FIG. 6, the feedstock 11 retains its configuration as it advances through the second region 17 during which period the feedstock 11 is either cooled or heat stabilized while being restrained by the belts 28 and 29. As is seen in FIG. 7, the feedstock 11 emerges as the finished sheet 13 which has a stable planar configuration.

The flat sheet 13 produced by the processes and apparatus illustrated in FIGS. 1–7 are substantially biaxially-oriented, semi-crystalline or amorphous, thermoplastic, polymer sheets which, unlike those of U.S. Pat. No. 4,282,277, have substantially uniform strain throughout the thicknesses thereof.

Orientation ratios in the range of 1.5 to 4.0 are generally considered most desirable for materials such as, for example, polypropylene. To achieve these orientation ratios, it is necessary to utilize machinery capable of maintaining pressures on the order of 1000 psi (70.3 kg/cm$^2$) such as the twin belt machines marketed by Kurt Held, Küsters and Bahre and Greten, West Germany. Material such as polyethylene, ultra high molecular weight polyethylene, polypropylene, and amorphous polyvinyl chloride have been successfully biaxially oriented to orientation ratios above 2.0 at pressures between 650 psi (45.7 kg/cm$^2$) and 1000 psi (70.3 kg/cm$^2$). At these pressures, materials such as polymethylmethacrylate which is an amorphous material, and polyacetal homopolymer which is a semi-crystalline material, have also been biaxially oriented.

In accordance with a further embodiment of the invention, a loop 80 of patterned metallic foil 81 may be inserted between the belt 28 and the feedstock 11 and if desired between the belt 29 and the feedstock in order to emboss a pattern on the final sheet 13 corresponding to patterns existing on the metallic foil.

The final product as exemplified by sheet 13, if made from a semi-crystalline polymer, is characterized by having a microstructure comprised of spherulitic crystalline aggregates which are compressed transversely to the plane of the product and are biaxially oriented in the plane of the product. The product is substantially devoid of any process induced microvoids and microfibrils. The product retains at least the same density as the unoriented polymer and is less permeable than a product made by conventional solid state stretching processes.

The product as exemplified by the biaxially-oriented, thermoplastic sheet 13 may contain up to about sixty weight percent filler material. Prior to the advent of BEXOR, it has been very difficult, if not impossible, to orient thermoplastic material which contains a substantial quantity of filler material. When a semi-crystalline thermoplastic polymer contains a filler and is worked in accordance with the present invention, the thermoplastic polymer can be successfully oriented as described above and will have a structure unlike previous products, in that it is substantially devoid of microvoids and microfibrils and having within the thermoplastic polymer discrete, platelet-like spherulitic crystalline aggregates which are compressed transversely to the plane of the product and biaxially-oriented in the plane of the sheet 13.

The sheet product 13 can be used as is for structural or like purposes, or other uses, but will in many cases be used as a blank to form final products such as, for example, solid state formed products. Many solid state formed products are so called stretch-formed products where the thermoplastic polymer is formed in a die under sufficient heat and pressure to deform the thermoplastic polymer in a solid state. The properties of the final solid state stretch-formed product will depend primarily upon the extent of deformation. However, the solid state stretchformed products made from the biaxially-oriented sheet blanks of the invention have superior properties compared with the properties of similar products made from unoriented thermoplastic polymer. For example, stretch-formed products made from the biaxially-oriented thermoplastic polymer sheet blanks of the invention will have a more uniform cross section since the superior properties of the oriented thermoplastic polymer prevent the thermoplastic polymer from "necking" down appreciably. The resulting product is thus more uniformly stiff and strong than would otherwise be the case. The actual properties of the stretch-formed product may vary from place to place in the product depending upon the amount of work or deformation applied to any given portion of the product. Any flanges on the product, being substantially unworked, will have the same superior characteristic properties as the original biaxially-oriented blank. In some products this is very important as the flanges provide important structural strength and toughness. The lips or flanges around the edges of refrigerator freezer door liners, freezer food containers, pans or tote boxes are representative of this type of product. Likewise, any portion of the product which is expanded less than roughly fifty percent will have enhanced property characteristics over the original oriented blank material. Therefore, products made from the biaxially-oriented blanks of the invention will usually have very significant portions which have superior properties compared to products made from an unoriented thermoplastic polymer, filled or unfilled, of the same composition.

By way of example only and as is set forth in U.S. Pat. No. 4,282,277, a typical structure of a polymer, which in this instance is isotactic polypropylene used as the starting polymer forming feedstock 11, is shown pictorially in FIG. 8. The structure of the biaxially-oriented sheet 13 is shown pictorially in FIG. 9.

If the polymer feedstock is polypropylene, it might, for example, have an initial thickness of 0.5 inches (12.7 mm) with the biaxially-oriented sheet 13 having a thickness of approximately one-tenth of an inch (2.54 mm).

The polypropylene utilized has approximately 65–70% crystallinity and density measurements indicate that there are little or no changes in crystallinity from the feedstock 11 to the sheet 13; the only change is in morphology.

With respect to amorphous polymers such as PMMA, PVC and polycarbonate, biaxial orientation improves impact strength by absorbing impact energy through delamination in contrast to energy absorbed by puncture or through cracking as is the case with unoriented polymers.

Initial markets for products produced by the apparatus and method of the instant invention are ballistic shields, formed articles requiring superior physical and mechanical properties, and punched strips to produce terminal boards for the electronics industry.

In essence, the invention in its preferred embodiment is directed to a process for the continuous production of rectangular, relatively rigid, thermoplastic sheets 13 having substantially uniform thickness in the range of 0.03 inches (0.76 mm) to 0.5 inches (12.7 mm) and a thickness-to-width ratio less than about 0.04. The sheets consist of a compressively, biaxially-oriented structure with essentially the same orientation ratio in all planes of the sheets. The sheets 13 have the combined properties of high strength, stiffness, low temperature impact and uniform thermal expansion. In essence, the sheets 13 are made by solid-state, continuous wedge forming of rectangular slabstock 11 between two flat converging belts 28 and 29 followed by substantially immediate post treatment in zone 17 between parallel belts to stabilize the product structure at the biaxial orientation ratio desired. The slabstock, which may contain up to 60% by weight of filler simultaneously spreads in both the transverse and longitudinal directions while between the belts 28 and 29 to produce a biaxially-oriented sheet structure with an elongation in both directions of at least 100%.

The process is capable of producing a continuous sheet of indeterminant length. However, the sheets may be discontinuous with the length of each sheet 13 being more than 20 feet (6.1 m) in order to provide discrete sheets which can be conveniently handled and if necessary cut into shorter lengths for whatever purposes are intended. The apparatus 10 continues to operate and maintain its temperature and pressure parameters in the intervals between insertion of billets in the production of discrete sheets.

The sheets produced by the process of this invention ordinarily are rectangular in cross-section and in the plane of the sheet, formed of a semi-crystalline thermal plastic polymer and is biaxially oriented; the sheet having a density which is equal to or greater than the density of the unoriented polymer and having a microstructure substantially devoid of process-induced microvoids and microfibrils; the sheet being comprised of compressed, platelet-like, crystalline aggregates, which are biaxially oriented in the plane of the sheet extent, the sheet having a substantially uniform distribution of deformed crystalline aggregates over the length and width thereof and through the thickness thereof.

The sheets of this invention are preferably produced as a continuous, rectangular, polymer sheet of substantially uniform thickness, the sheet comprising a biaxially-oriented, semi-crystalline, thermoplastic polymer having a density which is at least equal to the density of the polymer in the unoriented state and having a microstructure substantially devoid of process-induced microvoids and microfibrils; the sheet being further comprised of discrete, plate-like, crystalline aggregates formed from compressed, originally spherulitic aggregates; which aggregates are biaxially-oriented in the plane of the sheet extent, the sheet having substantially uniformly deformed crystalline aggregates over the length and width thereof and through the thickness thereof, resulting in a sheet which is thermally stable with substantially constant mechanical and physical properties in all planes.

The sheet preferably has a thickness from about 0.03 inches (0.76 mm) to about 0.5 inches (12.7 mm), e.g., 0.05 inches (1.27 mm) to 0.3 inches (7.62 mm) preferably, with a thickness-to-width ratio less than about 0.04, e.g., 0.001 to 0.01, preferably, and are produced in lengths of at least 20 feet (6.1 m), optionally, but preferably for some end uses.

The sheet contains filler material included therein which comprises up to 60% by weight of the sheet.

In one aspect, the sheet is continuously produced from a thermoplastic amorphous polymer, is rectangular, biaxially oriented and has a density which is at least equal to the density of the unoriented amorphous thermoplastic polymer and this amorphous sheet has a substantially uniform distribution of strain over the length and width thereof and through the thickness thereof and substantially constant mechanical and physical properties in all planes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

The following are illustrative examples of the twin-belt forging of polypropylene into biaxially oriented sheet in accordance with this invention.

EXAMPLE 1

Isotactic polypropylene slabs of Himont Corporation HE6023, produced by melt extrusion, were cut into strips 13.2 centimeters (5.2 inches) wide and 30 centimeters (11.8 inches) long. The thickness of the strips was 1.27 centimeters (0.50 inches). The strips had a density of 0.903, a crystallinity of 67.8% and peak crystalline melting temperature of 169° C. (336°) determined by differential scan calorimetry (D.S.C). A melt flow index of 0.4 dgm/min was measured on material machined from the slabs.

The surfaces of the strips were lightly scored in a one cm square (0.39 inches) grid pattern of side 1.00 centimeters and the gridded strips were heated in an air circulating oven for 60 minutes at an indicated temperature of 146° C. (295° F.) and placed on the bottom belt of a twin-belt machine with the center line of the length of the strip along the center line of the belt and parallel to the machine length. The machine had the following dimensions - Deformation zone length 19.5 centimeters (7.7 inches), Deformation angle 3.14°, Parallel zone 31.0 centimeters (12.2 inches), Belt width 66.0 centimeters (26.0 inches), Belt spacing at feed rolls 5.8 centimeters (2.3 inches), Belt Spacing at exit (downstream) rolls 0.2 centimeters (0.08 inches). The machine differed from that shown in FIG. 1 in that the parallel zone was not supported by platens.

Two strips with butted ends were fed through the twin belt machine described above at a belt speed of 1.2 meters/minute (3.9 feet/minute). The machine was stopped when the first strip had emerged from the downstream rolls and the second strip was completed contained within the deformation and parallel zones of the machine and the machine force air cooled to ambient temperature. On removal of the cooled strip from the machine, it was found to be substantially uniformly biaxially oriented at the end of the deformation zone.

Measurements of the grids mentioned above showed a machine direction grid length of 2.32 centimeters (0.91 inches) and a transverse grid length of 2.00 centimeters (0.79 inches). Thus, the ratio of the orientation in the machine to the transverse direction was 1.16 to 1.

Since the parallel zone was unsupported in this test, some relaxation of the orientation ratio in this zone was apparent. Conducting the above example on otherwise identical equipment which has adequate belt support in the parallel zone, e.g., as shown in FIG. 1, this relaxation is supported and a cooled product having the orientation ratio described above produced.

EXAMPLE 2

An experiment identical to that described in Example 1 above was run with the deformation angle reduced from 3.14° to 2.48°. Measurement of the grids after deformation showed a machine direction grid length of 2.00 centimeters (0.79 inches) and a transverse grid length of 2.33 centimeteres (0.92 inches). Thus, the ratio of orientation in the machine to the transverse direction was 0.86 to 1.

From the above examples, it is apparent that, for uniform equal biaxial orientation of polypropylene strip under the conditions described, the angle of deformation lies between 3.14° and 2.48°.

Following the above examples, sheets of this invention were formed from high density polyethylene, ultrahigh molecular weight polyethylene, polyacetal, polyamide 6—6 and PVC. Filled polymer sheets can also be formed, for example, from polypropylene containing (by weight) 30 parts micaflakes or talc or 40 parts calcium carbonate or 60 parts aluminum trihydrate flame retardant.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of producing biaxially-oriented polymer product from solid feedstock of solid polymer material comprising the steps of:
   introducing feedstock of solid polymer material in an axial direction between at least a pair of moving opposed surfaces, which surfaces converge in a downstream direction to compress the solid material while advancing the solid material;
   biaxially-orienting the solid material by simultaneously elongating the solid material in a longitudinal direction; spreading the solid material in a lateral direction, and reducing the thickness of the solid material, all by advancing the solid material between and with the moving opposed surfaces;
   maintaining the temperature of the solid material of the feedstock and the moving opposed surfaces between the glass transition temperature and the viscous flow temperature of the polymer thereof as the feedstock is being biaxially-oriented and
   restraining the polymer product after it has been formed from the feedstock for a period of time sufficient to stabilize the morphology and configuration thereof.

2. The method of claim 1, wherein the moving surfaces converge towards one another at an angle, the angle being in the approximate range of greater than zero degrees and less than six degrees.

3. The method of claim 1, wherein both the material is heated to a temperature level between the glass transition temperature and the viscous flow temperature of the polymer prior to initiating the process.

4. The method of claim 2, wherein the moving surfaces are heated to a temperature level between the glass transition temperature and the viscous flow temperature of the polymer prior to initiating the process.

5. The method of claim 1, wherein the material is cooled during the restraining step.

6. The method of claim 1, wherein the material is heated during the restraining step.

7. The method of claim 1, wherein the polymer is a semicrystalline polymer.

8. The method of claim 7, wherein the polymer is selected from the group consisting of polypropylene, polyethylene, ultrahigh-molecular weight polyethylene, polyacetal, polyamide, polyethylene terephthalate and polybutylene terephthalate.

9. The method of claim 1, wherein the polymer is an amorphous material.

10. The method of claim 9, wherein the amorphous material is selected from the group consisting of polyvinyl chloride, polymethylmethacrylate, polycarbonate and polyethylene terephthalate.

11. The method of claim 1, wherein the steps are continuous with the step of restraining the feedstock occurring immediately after the step of deforming the material.

12. A method of producing geometrically stable, biaxially-oriented polymer sheet from solid unoriented feedstock, the method comprising the steps of:
   biaxially orienting the solid unoriented feedstock to form the biaxially oriented sheet by inserting the unoriented feedstock between converging belt surfaces moving in a longitudinal direction to apply compressive pressure against the feedstock in order to reduce the thickness of the feedstock while spreading the feedstock laterally with respect to the direction of movement;
   maintaining the temperature of the feedstock between the glass transition temperature and the viscous flow temperature of the material thereof while the feedstock is being biaxially oriented, and
   restraining the biaxially oriented sheet between longitudinally moving, parallel belt surfaces as the sheet emerges from the conveying belt surfaces to stabilize the biaxially oriented sheet, whereby the sheet remains flat upon emerging from between the opposed parallel belt surfaces.

13. The method of claim 12 wherein the belt surfaces are continuously wedged into abutment with the feedstock and sheet by platens engaging belts on which the belt surfaces are disposed.

14. The method of claim 13 wherein the sheet is cooled while being restrained by the longitudinally moving, parallel belt surfaces.

15. The method of claim 13 wherein the sheet is heated while being restrained by the longitudinally moving, parallel belt surfaces.

16. The method of claim 13 wherein the converging belt surfaces converge toward one another at an angle in the approximate range of greater than zero degrees and less than six degrees.

17. The method of claim 13 wherein the feedstock is rectangular in cross section and the belt surfaces engaging the feedstock and sheet are planar and flat resulting in biaxially oriented sheet having continuously parallel upper and lower surfaces.

18. A method of producing biaxially-oriented polymer sheet from feedstock of solid polymer comprising the steps of:
   reducing the thickness of the feedstock between a pair of opposed, continuous belts which converge in at least one zone to biaxially orient the material of the feedstock while reducing the thickness of the feedstock to that of the sheet;
   maintaining the temperature of the feedstock between the glass transition temperature and the viscous flow temperature of the material thereof during the step of reducing the thickness of the feedstock; and
   restraining the sheet produced by reducing the thickness of the feedstock to the thickness of the sheet so that the sheet stabilizes, whereby the sheet emerges from the restraining step as a sheet having a stable, planar configuration.

19. The method of claim 18, wherein the feedstock and belts are heated to a temperature above the glass transition temperature and below the viscous flow temperature of the feedstock.

20. The method of claim 19, wherein the sheet is cooled while being restrained.

21. The method of claim 19, wherein the sheet is heated while being restrained.

22. The method of claim 19, wherein the polymer feedstock is a semi-crystalline material.

23. The method of claim 22, wherein the polycrystalline material is selected from the group consisting of polypropylene, polyethylene, ultrahigh-molecular weight polyethylene, polyacetal, polyamide, polyethylene terephthalate, and polybutylene terephthalate.

24. The method of claim 19, wherein the polymer is an amorphous material.

25. The method of claim 24, wherein the amorphous material is selected from the group consisting of polyvinyl chloride, polymethylmethacrylate, polycarbonate and polyethylene terephthalate.

26. The method of claim 18, further including the step of controlling the temperature of the feedstock and the belts during advancement of the feedstock to equalize surface friction between the feedstock and the belts with the compressive deformation resistance of the feedstock.

27. The method of claim 18, wherein the belts are supported uniformly over those portions in engagement with the feedstock and sheet during advancement of the feedstock sheet.

28. The sheet produced continuously by the process of claim 18, wherein the sheet is rectangular in cross-section and in the direction of sheet extent formed of a semi-crystalline thermoplastic polymer which is biaxially-oriented; the sheet having a density which is equal to or greater than the density of the unoriented polymer and having a microstructure substantially devoid of process-induced microvoids and microfibrils; the sheet being comprised of compressed, platelet-like, crystalline aggregates, which are biaxially-oriented in the direction of the sheet extent, the sheet having a substantially uniform distribution of deformed crystalline aggregates over the length and width thereof and through the thickness thereof.

29. The sheet of claim 28, wherein the sheet has a thickness greater than approximately 0.03 inches and less than approximately 0.5 inches with a thickness-to-width ratio less than approximately 0.04 and a length of at least 20 feet.

30. The sheet of claim 29, having a filler material included therein which comprises up to 60% by weight of the sheet.

31. The sheet continuously produced by the method of claim 18, wherein the sheet is made of a thermoplastic amorphous polymer, is rectangular, biaxially-oriented and has a density which is at least equal to the density of the unoriented amorphous thermoplastic polymer; the sheet having a substantially uniform distribution of strain over the length and width thereof and through the thickness thereof and substantially constant mechanical and physical properties in all planes.

32. The sheet of claim 31, wherein the sheet has a thickness greater than approximately 0.03 inches and less than approximately 0.5 inches with a thickness-to-width ratio less than approximate 0.04 and a length of at least 20 feet.

33. The sheet of claim 31, having a filler material included therein which comprises up to 60% by weight of the sheet.

* * * * *

UNITED STATES PATENT AND TRADEMARK OFFICE
CERTIFICATE OF CORRECTION

PATENT NO. : 4,874,657
DATED : October 17, 1989
INVENTOR(S) : YING-CHENG LO, ET AL It is certified that error appears in the above-identified patent and that said Letters Patent is hereby corrected as shown below:

On the title page, item [45], after date of patent, insert --*--(an asterisk);

item [73], reads "Kusan, Inc., Nashville, Tenn." should read --Aluminum Company of America, Alcoa Center, Pennsylvania--; and     between items [73] and [21], the following should be inserted:

--[*] Notice: The portion of the term of this patent subsequent to Dec. 6, 2005 has been disclaimed.--.

Signed and Sealed this

Seventeenth Day of March, 1992

Attest:

HARRY F. MANBECK, JR.

*Attesting Officer*       *Commissioner of Patents and Trademarks*